United States Patent [19]
Grassler et al.

[11] Patent Number: 5,820,913
[45] Date of Patent: Oct. 13, 1998

[54] PREPARATION OF MOUSSE CONTAINING STERILIZED CHOCOLATE PIECES

[75] Inventors: Walter Grassler, Polling; Manfred Wild, Meitingen, both of Germany

[73] Assignee: Nestec S.A., Vevey, Switzerland

[21] Appl. No.: 792,095

[22] Filed: Jan. 31, 1997

Related U.S. Application Data

[62] Division of Ser. No. 199,104, Feb. 22, 1994.

[30] Foreign Application Priority Data

Mar. 18, 1993 [EP] European Pat. Off. ............ 931044200

[51] Int. Cl.$^6$ ................................. A23L 2/00; A23G 1/00
[52] U.S. Cl. ............................................. 426/564; 426/584
[58] Field of Search ............................. 426/93, 100, 101, 426/249, 580, 572, 593, 584, 564

[56] References Cited

U.S. PATENT DOCUMENTS

| | | |
|---|---|---|
| 2,190,226 | 2/1940 | Alexander . |
| 2,282,313 | 5/1942 | Hershey . |
| 2,646,757 | 7/1953 | Hackmann . |
| 2,722,177 | 11/1955 | Routh . |
| 3,769,030 | 10/1973 | Kleinert . |
| 3,959,516 | 5/1976 | Waskentin . |
| 4,507,326 | 3/1985 | Tarantino . |

FOREIGN PATENT DOCUMENTS

| | | |
|---|---|---|
| 0221757 | 5/1987 | European Pat. Off. . |
| 59-19602 | 11/1984 | Japan . |
| 773404 | 4/1957 | United Kingdom . |
| 1169500 | 11/1969 | United Kingdom . |

OTHER PUBLICATIONS

Derwent Database Abstract, WPI Acc. No. 84–314695/51 and XRAM Acc. No. C84–134071, abstract of Mori et al., Japanese Patent Document Kokai No. 59–196028.
Database Abstract AN 71(10): G0388 FSTA for Nordisk Mejeri–Tidsskrift, (1970) 36(12) pp. 259–260 and 262.

*Primary Examiner*—Anthony J. Weier
*Attorney, Agent, or Firm*—Vogt & O'Donnell, LLP

[57] ABSTRACT

A composite product of a milk-based mousse and of chocolate product pieces is prepared. To do so, a chocolate product of a fat, cocoa butter and sugar in amounts, by weight, of from 50% to 70% fat, of from 30% to 50% cocoa powder and of from 1% to 10% sugar, is sterilized and a milk-based mixture, which is suitable for being overrun and preparing a mousse, also is sterilized, the sterilized mixture is overrun to obtain the mousse, and the sterilized chocolate product is delivered to and combined with the mousse so that the mousse contains pieces of the sterilized chocolate product therein and so that the pieces are in an amount of between 2% and 10% by weight, and then, the composite product so obtained is introduced into containers refrigerated.

11 Claims, 5 Drawing Sheets

PREPARATION OF MOUSSE CONTAINING STERILIZED CHOCOLATE PIECES

This application is a divisional application of application Ser. No. 08/199,104, filed Feb. 22, 1994.

BACKGROUND OF THE INVENTION

This invention relates to a preparation of product based on at least one mousse and containing pieces of chocolate.

Refrigerated products containing pieces of chocolate are already available on the market. However, these known products have a storage life in a refrigerator of less than 10 days. This is because, from the moment when pieces of chocolate are dispersed in a mousse treated by UHT, the diffusion of water from the mousse into the chocolate creates microbiological problems because the chocolate is not sterilized. On the other hand, due to the high sugar content of the chocolate, the diffusion of water breaks the crispy texture of the chocolate and the consumer no longer has any sensation of the presence of pieces of chocolate in the mousse.

SUMMARY OF THE INVENTION

The problem addressed by the present invention was to provide the consumer with a mousse-based product containing pieces of chocolate which would keep in a refrigerator for 5 to 6 weeks and in which the pieces of chocolate would remain intact over that period.

The present invention provides a product based on at least one mousse and containing pieces of chocolate in which the mousse contains between 2 and 10% by weight of chocolate, the chocolate being sterilized and containing by weight from 50 to 70% of fats, from 30 to 50% of cocoa powder and from 1 to 10% of sugar, and the chocolate may contain from 1 to 3% sugar.

The present invention provides a process for production of the composite product comprised of a mousse and chocolate product pieces described above wherein a chocolate product which comprises a fat, cocoa butter and sugar in amounts, by weight, of from 50% to 70% fat, of from 30% to 50% cocoa powder and of from 1% to 10% sugar is sterilized, a milk-based mixture, which is suitable for being over-run and preparing a mousse, is sterilized and then over-run to obtain the mousse, the sterilized chocolate product is delivered and combined into the mousse so that the mousse contains pieces of the chocolate product and so that the chocolate product pieces are in an amount of between 2% and 10% by weight, and then, the composite product so obtained is introduced into a container and refrigerated. The process also may be carried out by combining a second mousse with the composite product when introduced into a container, and a rotary filling head may be used so that the two mousses create a spiral appearance.

Further, the process of the present invention includes sterilization of the chocolate product as set forth above, treating the milk-based mixture by UHT to sterilize the milk-based mixture, and a cooled stream of the sterilized chocolate is delivered continuously or intermittently (herein "at least intermittently") into a cooled stream of the mousse so that the chocolate product of the cooled chocolate product stream solidifies within the cooled mousse stream to obtain solidified chocolate product in the cooled mousse stream, and in an embodiment, a cooled chocolate product strand is introduced into the mousse stream and after solidifying, is cut to obtain pieces, and the pieces and mousse are mixed to obtain the composite product.

DETAILED DESCRIPTION OF THE INVENTION

In the context of the invention, a mousse is understood to be an overrun milk-based product additionally containing sugar, a flavouring ingredient (such as cocoa, chocolate or the like), cream and a thickener or gelling agent. An overrun product is understood to be a product which has undergone an increase in volume of from 80 to 120% through overrunning. However, it is pointed out that these limits are not critical.

According to the invention, a product with a longer storage life can be obtained because the chocolate used has been sterilized, the mousse being treated by UHT before overrunning. This treatment is only possible because of the low sugar content of the chocolate. The sugar used in the chocolate is sucrose or invert sugar or fruit sugar, such as glucose.

The refrigerated product according to the invention normally contains, in a cup, two different mousses each containing pieces of chocolate in the proportions indicated above. The invention also encompasses a refrigerated product based on two mousses, of which only one contains pieces of chocolate, and encompasses a product consisting of a single mousse containing the pieces of sterilized chocolate mentioned above. If the refrigerated product contains two mousses, filling may be carried out so that vertical or horizontal layers may are formed, and if a rotary metering head is employed, spiral layers may be formed. A surface layer based on cream, for example whipped cream, may also be provided.

In terms of fats, the chocolate used consists of cocoa butter. The pieces of chocolate are between 1 and 4 mm in size and are uniformly distributed throughout the mousse.

The product keeps in a refrigerator at a temperature of 4° to 8° C.

In carrying out the process of the present invention, the chocolate is normally sterilized in a tank for 10 to 30 minutes at a temperature of 110° to 130° C. The mixture for the mousse is treated by UHT, i.e., for 5 to 40 seconds at a temperature of 130° to 150° C., and then overrun to obtain an increase in volume of 80 to 120%.

The chocolate has to be delivered to the injection nozzle in the liquid state, i.e., at a temperature of 25° to 30° C.

The mousse is delivered to the nozzle at a temperature of 8° to 12° C. When the two streams are combined, the strand of chocolate has to be given time to solidify. Accordingly, a contact time of 30 to 60 seconds has to be allowed before the strand of chocolate is cut. The strand of chocolate is cut in such a way that the pieces of chocolate have an average size of from 1 to 4 mm.

In the embodiment based on the strand of chocolate, the strand and the mousse have to be delivered to the injection nozzle in such a way that they arrive at the same rate, namely at a rate of 0.05 to 0.15 m/s.

The rate at which the mousse and the chocolate arrive at the nozzle is not critical and depends on the desired output.

In the second embodiment of the process, pieces of chocolate are directly injected into the nozzle. This may be done, for example, with an alternating metering system comprising two lines each equipped with a valve, each of the lines alternately delivering the pieces of chocolate into the stream of mousse at a very high rate.

The mousse containing the pieces of chocolate then arrives in a tank which feeds a volumetric metering head which in turn directly fills the cup placed beneath it in the case of filling with a single mousse. If the cup is filled with two mousses, one containing pieces of chocolate and the other containing no chocolate, a volumetric metering unit for each mousse feeds a rotary metering head which then simultaneously delivers the two mousses into the cup.

Also provided is an apparatus installation for carrying out the process described above, wherein the installation apparatus comprises a UHT line for the preparation of mousse, a chocolate sterilization line, an injection nozzle joining the two lines, a cutting system for cutting the strand of chocolate, a rotary metering nozzle for filling a mousse containing pieces of chocolate and a normal mousse and a volumetric metering system for delivering each mousse to the rotary nozzle.

In the apparatus installation of the present invention, the mousse preparation line operates continuously with an overrunning system before the injection nozzle. The chocolate sterilization line operates discontinuously and consists of a tank equipped with a heating jacket for sterilization. Arranged at the tank exit is a pump which delivers the chocolate to the nozzle under a pressure of 2.5 to 3.5 bar.

The injection nozzle is the key element of the installation. It comprises a feed passage for the strand of chocolate and two feed passages for the mousse arranged symmetrically in relation to the feed passage for the strand of chocolate. The cross-section of the chocolate feed passage depends on the pressure under which the chocolate arrives, the overrun of the mousse and the desired percentage of chocolate in the mousse, which normally amounts to between 5 and 15% of the total cross-section of the stream of mousse.

As mentioned above with reference to the process, the streams of chocolate and mousse must remain in contact before the strand of chocolate is cut. The distance between the injection nozzle and the cutting system is between 5 and 8 m. This distance enables the strand of chocolate to arrive at a temperature of the order of 12° C.

The system for cutting the strand of chocolate consists of an enclosure in which is mounted a rotary shaft driven by a motor and comprising several blades. Downstream of the blades, paddles are provided on the rotary shaft to promote mixing of the mousse with the pieces of chocolate.

The cutting system is followed on the production line by a holding tank connected to a volumetric metering unit which in turn is connected to a rotary nozzle known and used in the field of deep-frozen foods and ice creams.

The production line is either of the aseptic type or of the highly hygienic type.

The invention is described in more detail with reference to the accompanying drawings.

DETAILED DESCRIPTION OF THE DRAWINGS

Figure 1:
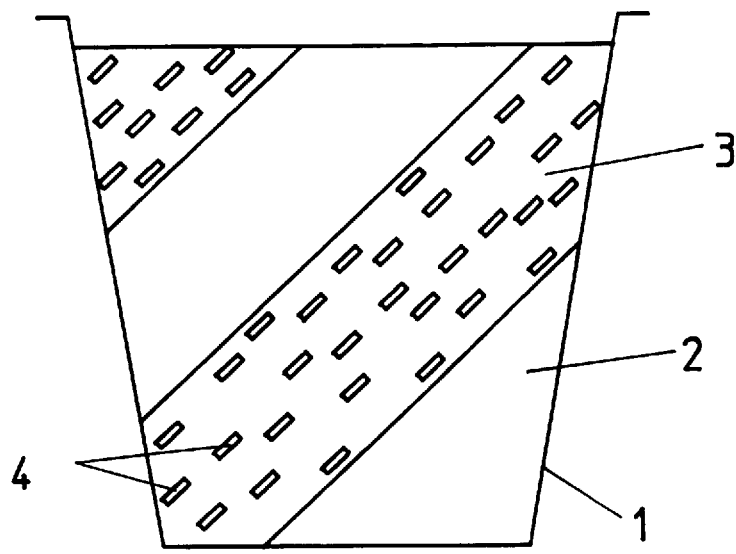
FIG. 1 is a side elevation of a refrigerated product according to the invention.
Figure 2:
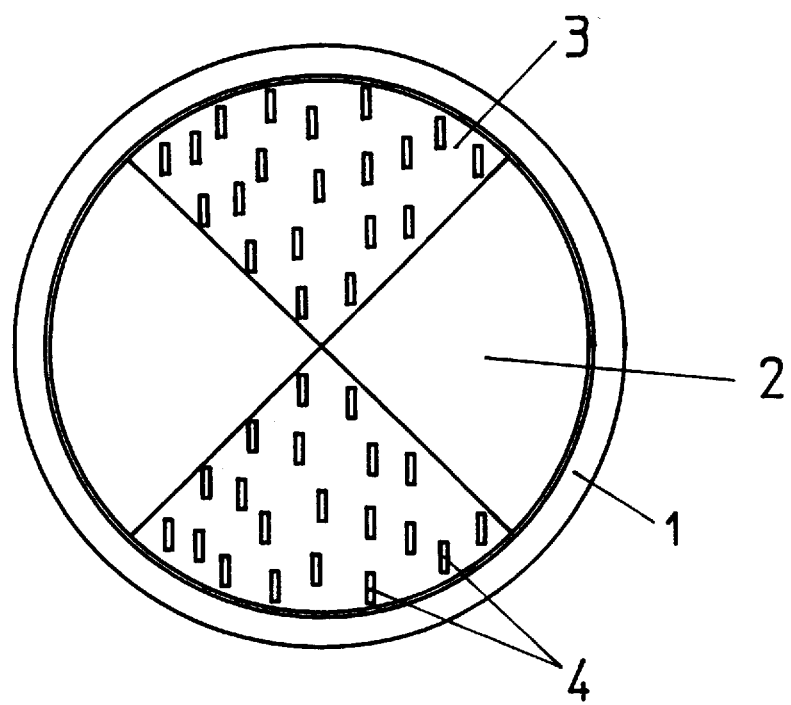
FIG. 2 is a view of the same product from above.

The product according to the invention as illustrated in FIGS. 1 and 2 is packed in a cup (1) and consists of a mousse (2) and a mousse (3) containing pieces of chocolate (4). The total weight of the product may be 60 g, i.e., 15 g per zone. Filling with the rotary metering head creates a spiral appearance. For example, the mousse (3) may be a plain chocolate mousse with pieces of chocolate while the mousse (2) may be a coffee or milk chocolate mousse (2).

Figure 3:
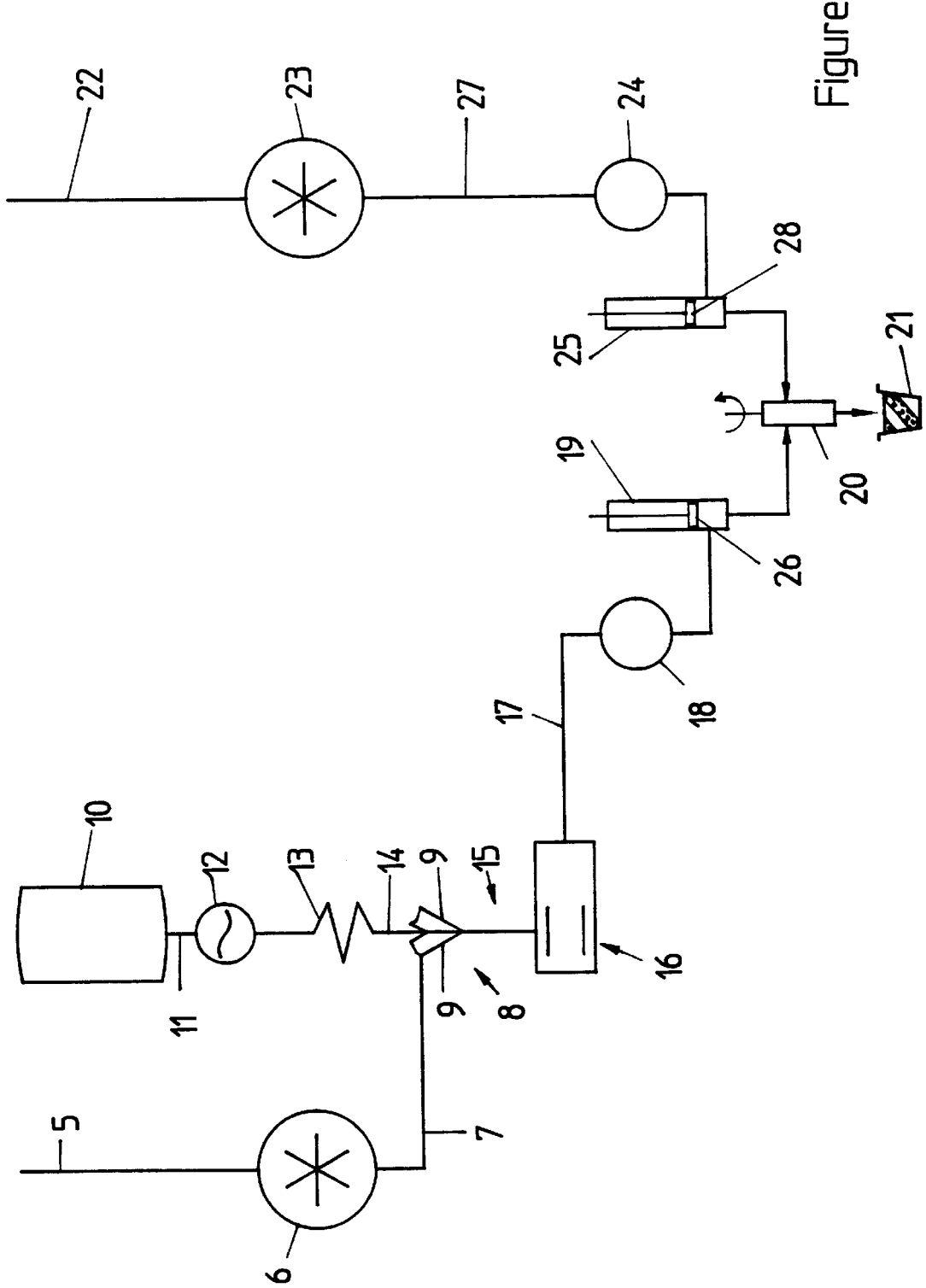
FIG. 3 diagrammatically illustrates a production line according to the invention.

Referring to FIG. 3, the mixture based on milk treated by UHT, which forms the mousse phase (3), arrives through the line (5). This mixture is overrun with nitrogen (or any other inert gas) in (6) so that an increase in volume of 120% is obtained.

The mousse (3) is delivered through the line (7) to the injection nozzle (8) which comprises two symmetrical feed passages (9).

The tank (10) is provided for sterilization of the chocolate. After sterilization, the chocolate passes through the line (11) and is delivered by the pump (12) to a cooling system (13) where the chocolate is cooled to around 30° C. It then passes through (14) to the injection nozzle (8).

A contact zone (15) is then provided in the form of a cylindrical tube in which the strand of chocolate solidifies in the stream of mousse. The cutting system (16) cuts the strand of chocolate, and the mixture of mousse and pieces of chocolate is delivered through the line (17) into a tank (18) from which it passes into a volumetric metering unit (19) comprising a piston (26).

The mousse (2) is correspondingly prepared from the line (22) which brings the UHT-treated milk-based mixture to the overrunning station (23). The mousse passes through the line (27) into a tank (24) from which it is fed into the volumetric metering unit (25) comprising a piston (28).

The metering units (19) and (25) then deliver the respective mousses in measured quantities into the rotary nozzle (20) so that the cup (21) can be filled.

The injection nozzle, the cutting unit and the rotary metering unit are described in more detail with reference to the following Figures.

Figure 4:
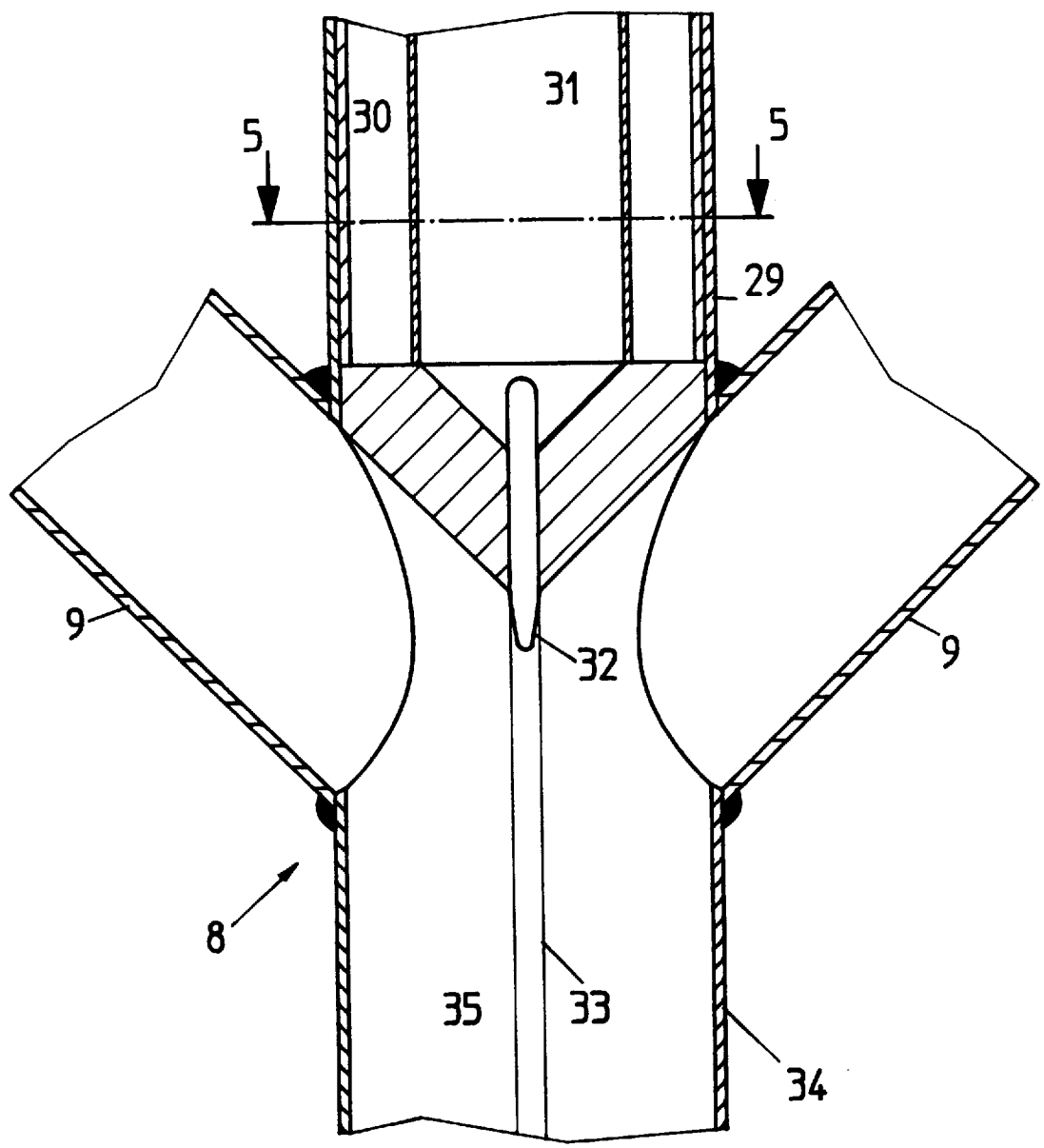
FIG. 4 diagrammatically illustrates an injection nozzle for obtaining a strand of chocolate.
Figure 5:
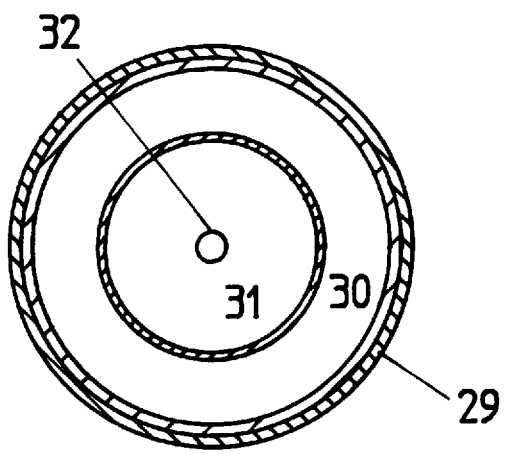
FIG. 5 is a section on the line 5—5 of FIG. 4.

FIGS. 4 and 5 show the injection nozzle (8) used in the installation shown in FIG. 3. This nozzle comprises two feed passages (9) for mousse and one feed passage (29) for chocolate, which is equipped with a heating jacket (30) to keep the chocolate in the liquid state, and the actual feed line (31) for the chocolate. The chocolate passes through the slot (32), which is round or oblong in shape, and forms a strand (33) in the mousse (35). As mentioned above, the line (34) is between 5 and 8 m in length.

Figure 6:
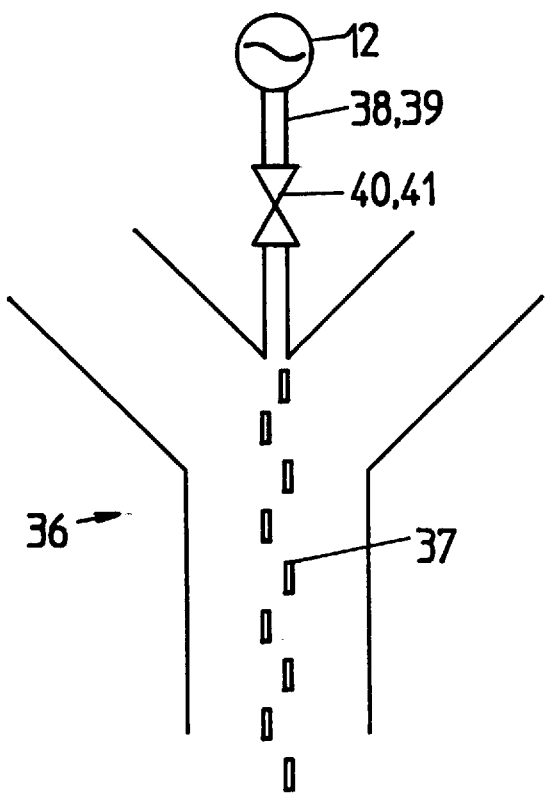
FIG. 6 diagrammatically illustrates an injection nozzle for obtaining pieces of chocolate.
Figure 7:
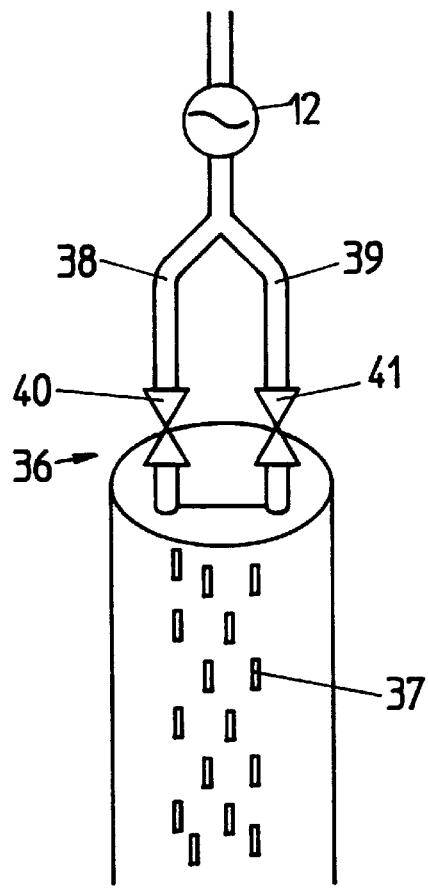
FIG. 7 is a diagrammatic illustration corresponding to FIG. 6, but at an angle of 90° in relation to FIG. 6.

FIGS. 6 and 7 show an embodiment of an injection nozzle (36) for directly obtaining pieces of chocolate (37). The feed stream of chocolate is separated after the pump (12) so that two streams (38,39) are formed and the valves (40) and (41) are alternately opened and closed at a frequency of the order of one millisecond. Pieces of chocolate of the required size, i.e., 1 to 4 mm, are thus obtained.

Figure 8:
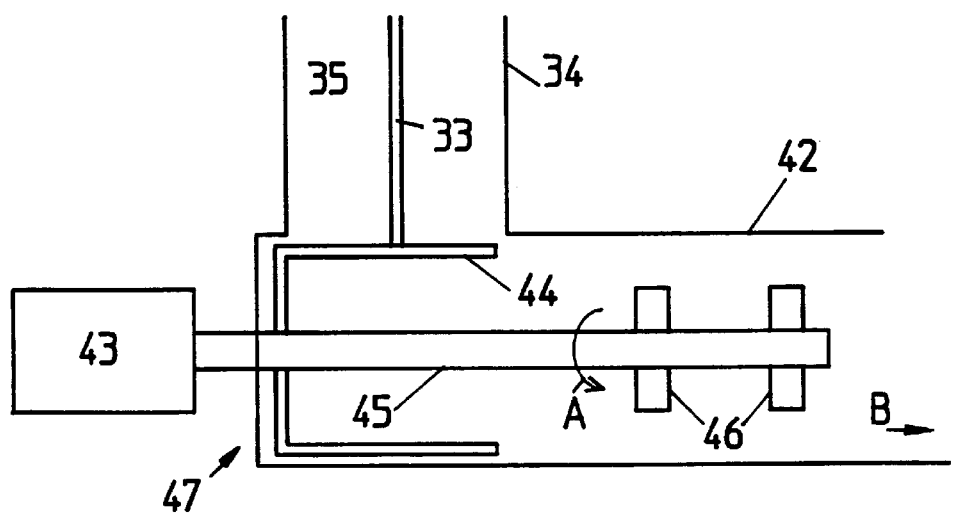
FIG. 8 diagrammatically illustrates a system for cutting the chocolate.

FIG. 8 shows the cutting system used in the installation shown in FIG. 3. The mousse (35) surrounding the strand of chocolate (33) arrives through the line (34) at the cutting station (47). The cutting station comprises in an enclosure (42) a rotary shaft (45) which is driven by a motor (43) and comprises blades (44) and mixing paddles (46). The shaft rotates in the direction of arrow (A) and the mixed product flows in the direction of arrow (B) to the tank (18). Six blades (44) are normally provided on the shaft.

The invention is further illustrated by the following Example.

EXAMPLE

A refrigerated product according to the invention consists of chocolate pieces of a single plain chocolate mousse obtained from 65% (by weight) of skimmed milk, 14% of sugar, 7% of chocolate, 3% of cocoa powder, 5% of cream and known thickeners. The mousse makes up 94% and the chocolate pieces 6%.

The chocolate is made from 68% of cocoa butter, 30% of cocoa powder and 2% of sugar.

The chocolate is prepared by sterilization for 15 minutes at 125° C.

The mixture of mousse ingredient is heat-treated for 120 seconds at 130° C. and then cooled to 80° C. It is overrun with nitrogen under 7 bar to obtain an overrun of 120%.

The mousse is delivered at 8° C. to an injection nozzle at a rate of 500 kg/h. The chocolate is delivered at a rate of 40 kg/h and with a temperature of 30° C. The cutting system rotates at 200 r.p.m. and the product is packed under completely hygienic conditions at a rate of 120 cups per minute.

We claims:

1. A process for preparing a composite product of chocolate pieces contained in a mousse comprising sterilizing a chocolate product which comprises a fat, cocoa powder and sugar in amounts, by weight, of from 50% to 70% fat, of from 30% to 50% cocoa powder and of from 1% to 10% sugar to obtain a sterilized chocolate product and sterilizing a milk-based mixture, wherein the mixture is suitable for being overrun to prepare a mousse, to obtain a sterilized milk-based mixture and overrunning the sterilized mixture to obtain the mousse, delivering the sterilized chocolate product in a liquid state to the mousse and combining the sterilized liquid chocolate product into the mousse, wherein the mousse has a temperature so that the mousse is cooled so that the sterilized liquid chocolate product solidifies and wherein the sterilized liquid chocolate product and the mousse are combined, so that the mousse contains pieces of the sterilized chocolate product therein and so that the pieces are in an amount of between 2% and 10% by weight, to obtain a composite product, and then, refrigerating the composite product.

2. A process according to claim 1 wherein the milk-based mixture is UHT-sterilized.

3. A process according to claim 1 or 2 wherein the chocolate product is sterilized at a temperature of from 110° C. to 130° C. for from 10 minutes to 30 minutes and the milk-based mixture is sterilized at a temperature of from 130° C. to 150° C. for from 5 seconds to 40 seconds.

4. A process according to claim 1 or 2 wherein the chocolate product comprises the sugar in an amount of from 1% to 3%.

5. A process according to claim 1 or 2 wherein the liquid chocolate product is cooled sterilized chocolate product stream and is delivered at least intermittently to a mousse stream, wherein the mousse stream has the temperature so that the mousse is cooled so that the chocolate product of the cooled chocolate product stream solidifies within the mousse stream.

6. A process according to claim 5 wherein the cooled chocolate stream delivered has a temperature of from 25° C. to 30° C. and the cooled mousse stream into which the cooled chocolate stream is combined has a temperature of from 8° C. to 12° C.

7. A process according to claim 5 further comprising cutting the solidified chocolate product to combine the chocolate product further in the mousse stream and to obtain the chocolate product pieces within the cooled mousse stream.

8. A process according to claim 7 further comprising, after cutting, mixing the pieces and cooled mousse stream.

9. A process according to claim 7 wherein, prior to cutting, the cooled mousse stream and the chocolate product of the cooled chocolate product stream injected into cooled mousse stream are in contact for from 30 seconds to 60 seconds.

10. A process according to claim 5 wherein the cooled chocolate product and mousse streams flow at a same rate in a range of from 0.05 m/s to 0.15 m/s.

11. A process according to claim 5 wherein the cooled chocolate product stream is injected intermittently into the cooled mousse stream to obtain the pieces.

* * * * *